Figure 1:
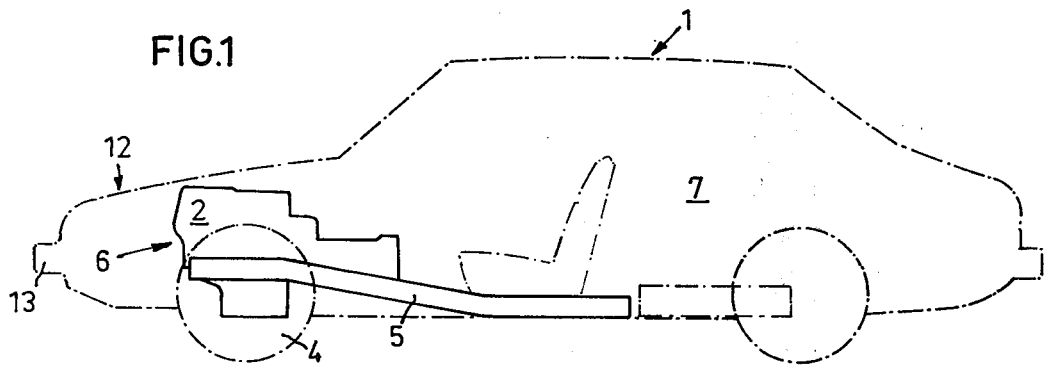

United States Patent [19]
Norlin

[11] 3,879,073
[45] Apr. 22, 1975

[54] COLLISION FORCE ABSORBING ARRANGEMENT IN VEHICLES

[75] Inventor: Stig Ivar Norlin, Trollhattan, Sweden

[73] Assignee: Saab-Scania AB, Sodertalje, Sweden

[22] Filed: Nov. 21, 1973

[21] Appl. No.: 418,127

[30] Foreign Application Priority Data
Nov. 24, 1972 Sweden.............................. 15321/72

[52] U.S. Cl..................... 293/1; 180/82 R; 293/60; 296/35 A; 213/1 A; 105/5
[51] Int. Cl........................ B60r 19/02; B62d 21/18
[58] Field of Search................ 280/106 R, 106.5 A; 296/28 F, 28 K, 35 R, 35 A; 180/82 R; 293/89, 1, 60; 213/1 A; 105/5

[56] References Cited
UNITED STATES PATENTS

| | | | |
|---|---|---|---|
| 2,900,036 | 8/1959 | Blake | 296/35 B |
| 3,279,816 | 10/1966 | Issigonis | 280/106 |
| 3,419,303 | 12/1968 | Eggert | 296/28 F |
| 3,525,413 | 8/1970 | Kripke et al. | 180/82 R |
| 3,589,466 | 6/1971 | Dudley | 180/82 R |

FOREIGN PATENTS OR APPLICATIONS
892,554 10/1953 Germany .................... 280/106

Primary Examiner—Kenneth H. Betts
Attorney, Agent, or Firm—Cushman, Darby & Cushman

[57] ABSTRACT

In a vehicle having the engine supported by a chassis unit to which is attached the vehicle body, the body is arranged to be displaceable forward relative to the chassis unit at a certain impact, thereby causing contact surfaces on the body and on the chassis unit to transfer collision forces in such directions that the body is split in its lengthwise direction in a controlled manner to reduce loads on passengers in the vehicle.

10 Claims, 5 Drawing Figures

3,879,073

COLLISION FORCE ABSORBING ARRANGEMENT IN VEHICLES

The present invention relates to a collision force absorbing arrangement in vehicles, where the driving means for the vehicle is supported by a chassis unit, to which is attached a vehicle body comprising a driver's seat in a coupe.

In conventionally constructed vehicles in a frontal collision the driver, passengers and vehicle are subjected to great deceleration forces which often result in extremely serious injuries. One of the causes is that the engine during the collision, is forced unchecked into the coupe. To increase the possibilities that the driver and passengers will avoid being injured in a frontal collision, it is known to make the front portion of the vehicle body deformable in a special way so as to obtain a collision force absorbing effect. It is also known to make the motor anchoring means such that, in a powerful collision, the engine is released and with the help of special arrangements, is guided, for example downward under the passenger space.

These measures are intended, on the one hand, to increase the deceleration time, causing reduced deceleration forces, and on the other hand, to keep the passenger space intact. Experience has shown, however, that these measures are in general not sufficient, and that it is difficult to achieve sufficiently great collision force absorbtion to prevent serious passenger injuries. In special safety vehicles the length of the vehicles has been increased in front of the engine to thereby increase the deformable length of the vehicle, but this has, among other things, the disadvantage that the length of the vehicle increases in a way which is disadvantageous in other respects.

The purpose of the invention is to eliminate the above disadvantages and to obtain an arrangement that better than previously reduces the loads on the passengers in the vehicle during a collision.

This is achieved according to the invention by the chassis unit and the vehicle body being arranged, at a predetermined exceptional load, caused for example by a frontal collision, to be displaceable relative to each other in the lengthwise direction of the vehicle from a mutually by means of fasteners fixed normal position, the chassis unit and the vehicle body being provided with contact surfaces, said contact surfaces being arranged to work in conjunction with each other in such a way that when the body is displaced forward relative to the chassis unit, longitudinal collision forces are divided into oppositely away from the lengthwise direction of the body directed force components, which tend to, in the process of absorbing the collision impact, bend apart the two on each side of the lengthwise central axis of the vehicle located side halves of the body.

According to the idea of the invention the body is constructed to be able to absorb a certain predetermined collision force before it is displaced in relation to the chassis unit. For this purpose the body is equipped with shock absorbing means allowing a predetermined deformation distance for the vehicle without changing the shape of the body or the chassis unit. This makes it possible for the front end of the vehicle to absorb forces from moderately heavy collisions so that the displacement between the body and the chassis unit only occurs in a heavier collision. By having the drive aggregate, for example an engine, being securely anchored on or in the chassis unit an effective force absorbtion is obtained, at the same time as bending apart or splitting of the vehicle gives an increased deformation distance for the body without any major increase in the length of the vehicle. This results in a reduction of the loads on the driver and the passengers.

According to one advantageous embodiment of the invention the chassis unit carries the vehicle front wheel suspension which can also be so constructed that when the body is displaced relative to the chassis unit the front wheels are turned to a position essentially transverse to the longitudinal direction of the vehicle. In this way the front wheels can be used to better protect the passengers in the vehicle. Furthermore the mass of that portion of the body which continues forward after the engine has been stopped is reduced and this results in reduced force absorbtion requirements.

Also, the chassis unit can have a lengthwise axis directed in the lengthwise direction of the vehicle and being located essentially on the lengthwise centre line of the vehicle and said chassis unit can suitably be wedge-shaped with the wide end of the wedge pointing forwards. Further, the rear portion of the wedge can be fastened inside a tunnel-like raised section in the floor of the body, conforming to the shape of the wedge. The side surfaces of the wedge serve as contact surfaces of the chassis unit and are designed to cooperate with corresponding side surfaces inside the raised section in the floor of the vehicle. This construction makes a simple force absorbtion possible, as well as an effective splitting of the vehicle.

Figure 2:
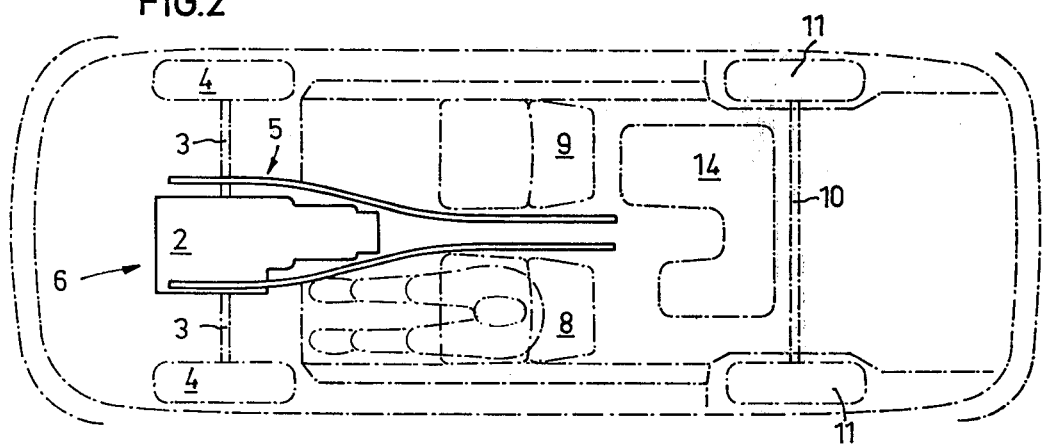
Figure 3:
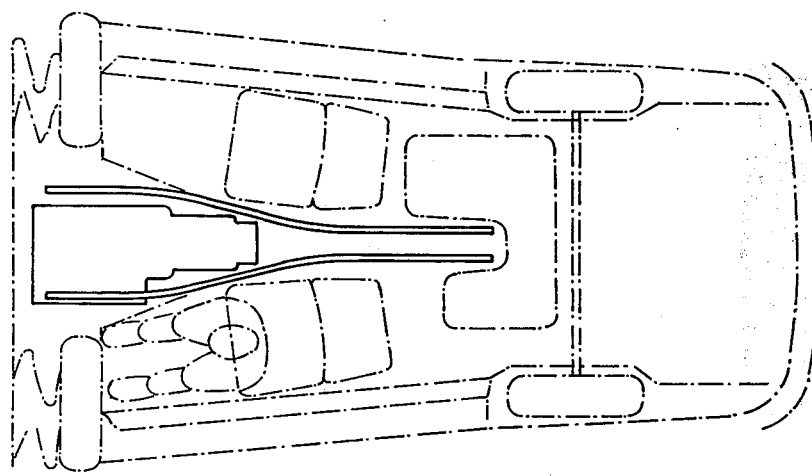
Figure 4:
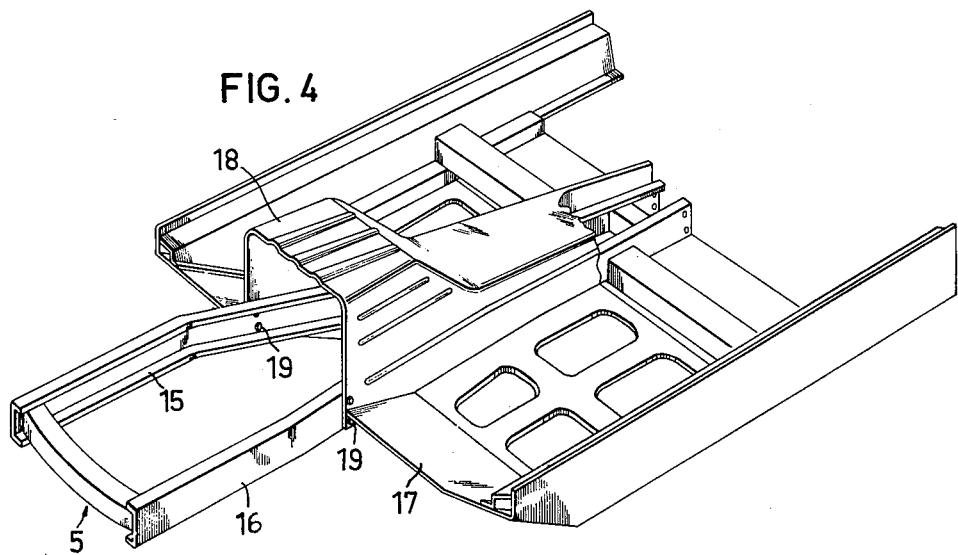
Figure 5:
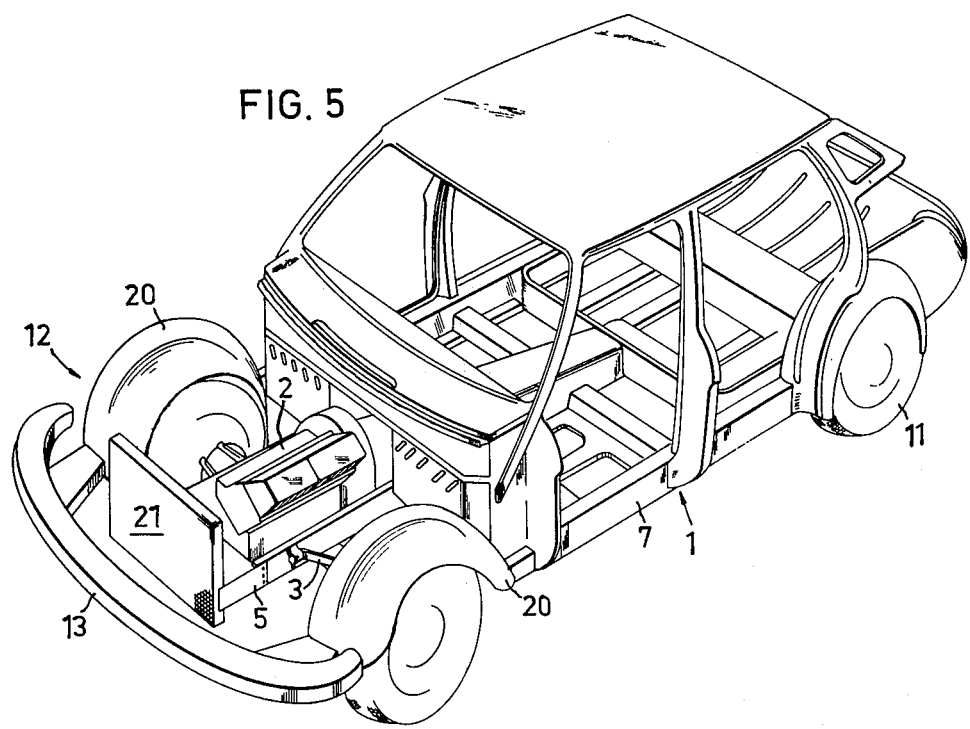

These and other details and advantages characteristic of the invention are explained further with reference to the examples shown in the accompanying drawings, of the arrangement according to the invention in which:

FIG. 1 shows schematically from the side the placement of engine and chassis unit in a vehicle constructed according to the invention, FIG. 2 shows schematically from above the arrangement according to FIG. 1, FIG. 3 shows schematically from above the position of the engine and chassis unit after a collision, FIG. 4 shows how the chassis unit is arranged to engage into a portion of the bottom of the vehicle, and FIG. 5 shows a schematic perspective view of a vehicle provided with an arrangement according to the invention.

The vehicle 1 shown in FIGS. 1 and 2 has an engine 2 placed in the front and has front wheel drive. The engine 2 and the front wheel suspension 3 with the front wheels 4 is carried by a chassis unit 5 and forms together with said parts a unit 6 of great durability. A body 7, which can be alternatively a cab or a body is symmetrically attached to said unit with shearable fasteners. The chassis unit 5 extends backwards in the longitudinal direction of the vehicle between a driver's seat 8 and an adjacent passenger seat 9. The rear axle suspension 10 with the rear wheels 11 is carried by the body 7. The front portion 12 of the vehicle with shock absorbing bumpers 13 is designed, by known means, to absorb minor collision forces and to allow force absorbing deformation without affecting the coupe space of the vehicle.

When the vehicle 1 is subjected to a frontal collision which deforms the body 7, the impact is first reduced by the impact absorbing means 13, whereafter the front portion 12 is pressed together and further reduces the impact without affecting the relative position between the engine chassis unit 6 and the body 7. If the speed at the collision causes an exceptional deceleration load then the fastening between the body 7 and the engine-chassis unit 6 is released, and the body 7 continues its forward motion. During this forward motion of the body 7 the remaining longitudinal collision forces are divided into force components directed away from either side of the chassis member 5. Said force components attempt to bend out both halves of the body 7 in opposite directions, whereby the driver and front-seat passenger fastened in the seats 8, 9 with seat belts are displaced on either side of the engine 2 and thereby avoid striking the same.

The front wheel suspension is preferably designed in such a way that the front wheels, when the body 7 is displaced relative to the chassis unit 5, are caused to be turned transversely to the longitudinal direction of the vehicle, as shown in FIG. 3. In this way they will constitute an extra protection in front of the driver and the front-seat passenger, who, as was mentioned previously, are displaced laterally in relation to the longitudinal centre line of the vehicle. To further prevent injuries to the driver and the front-seat passenger the body 7 should be so constructed that the required leg room on both sides is not subjected to serious deformations. Furthermore, a fuel tank 14 attached in the body 7 should be placed and designed so that it is not damaged by the chassis unit 5 during relative displacement of the body 7. In the embodiment exemplified in the Figures the fuel tank 14 is provided with a suitable recess.

The details of the solution outlined above for absorbing collision forces by arranging the engine and a chassis unit to split the body in a controlled manner can be quite varied. In the embodiment shown in the Figures, the chassis unit 5, see especially FIG. 4, includes two longitudinal beams 15 and 16, the rear ends of which come closer to one another in the manner of a wedge, so that the chassis unit 5, seen from above, can be said to have the shape of a wedge. The rear ends of the beams 15 and 16 are normally attached inside a tunnel-like raised section 18 in the body 7 and disposed in the floor 17 of the vehicle, said raised section acting as a guide for the beams. The sides of the beams 15 and 16 facing the inner side surfaces in the raised section together with said side surfaces in the raised section form cooperating contact surfaces on the chassis unit and in the body 7. When the chassis unit 5 under the effect of the relative displacement movement of the body 7 is forced like a wedge into the raised section at least the lower portion of the raised section will be forced laterally outward by the beams 15 and 16, the result being that the relative movement between the chassis unit 5 and the body 7 being retarded because the longitudinal collision force is divided up into components directed to both sides.

The body 7, as was previously mentioned, is attached to the chassis unit 5 in such a way, that the fastening is released at a certain impact. In the example shown here the beams 15 and 16 are fastened to the raised section 18 with the help of a number of bolts 19, which are designed to be sheared off at a certain stress. The bolts 19 can be elastically mounted either in the chassis unit 5 or in the body 7, or in both of them, e.g. with the help of rubber bushings. Attachment can also be done with the help of other specially made fasteners, which, for example, can be provided with additional force-absorbing devices of mechanical or hydraulic type or a combination thereof.

The desired division of the collision force into components directed towards the sides of the vehicle can also be effected in other ways than by having a wedge-like construction of the chassis unit 5. For example, it is possible to provide instead two parallel elements in the chassis unit 5 with a number of oblique contact surfaces designed to work in conjunction with corresponding contact surfaces in the body 7, and it is also conceivable to allow the chassis unit and the body to act on each other via contact surfaces which in turn act on some type of lever or linkage system which can be of hydraulic or mechanical type.

In FIG. 5 it is shown schematically how a vehicle 1 can be constructed according to the invention. The vehicle front portion 12 which is represented here by the bumper 13 and the wheel housings 20, is solidly connected to the body 7 and forms something like a frame around the engine 2, which together with the front wheel suspension 3 and a radiator 21 and other engine fixtures not shown is anchored on the chassis unit 5. By constructing the upper portion of the raised section 18 and the cowl (not shown) with seams or slits it is possible to reduce or possibly eliminate the risk that the vehicle be deformed in such a way that the windshield breaks in a collision. The lower portion of the cowl should then join the displacement movement of the body 7 while the upper portion, to which the windshield is attached, can essentially maintain its position. Also the body 7 can be constructed in such a way that various sections remain intact, break or are deformed at a certain load. In the engine compartment of the vehicle the components belonging to the engine should be placed in zones in such a way that, on the one hand, they are essentially carried by the engine or the chassis unit 5 or are placed in so-called safe zones, and, on the other hand, the components in a collision do not hinder a predetermined deformation of the vehicle and do not give rise to fire danger.

The construction described above is not limited to front wheel drive passenger vehicles, nor to vehicles with engines in the front. Rather the invention with appropriate modifications can be adapted to other types of vehicles having different construction and purpose.

What I claim is:

1. In a vehicle constructed to undergo collision force absorbing deformation during a collision in a lengthwise direction of the vehicle: a chassis unit disposed symmetrically in the vehicle and extending lengthwise of the vehicle; driving means anchored to said chassis unit; a vehicle body secured to said chassis by means of fasteners which are designed to yield and/or break at exceptionally high loads in a lengthwise direction in order to allow displacement between the vehicle body and the chassis unit during collision; and means associated with said chassis unit and said body having mutually engageable contact surfaces disposed and arranged to work in conjunction with each other such that load transfer between said body and said chassis unit takes place along lines forming an angle with a vertical plane containing the central lengthwise axis of the vehicle, said load transfer tending to split said body during a lengthwise collision.

2. A vehicle as in claim 1 including shock absorbing means for absorbing minor collision foce before said body becomes displaced relative to said chassis unit.

3. A vehicle as in claim 1 including a rear wheel suspension carried by said body.

4. A vehicle as in claim 1 including a front wheel suspension carried by said chassis unit.

5. A vehicle as in claim 1 wherein said chassis unit includes a wedge-shaped portion having its wider end facing forward.

6. A vehicle as in claim 5 wherein said body includes a floor having a raised tunnel-like section which is contoured generally complementary to the narrower end of the wedge-shaped portion of said chassis unit, said narrower end being attached inside said tunnel-like section.

7. A vehicle as in claim 6 wherein said chassis unit includes two outer beams which are engageable with the sides of said tunnel-like section, said beams and sides forming said contact surfaces.

8. A vehicle as in claim 7 wherein said driving means is an engine unit securely attached to the front portion of the chassis unit.

9. A vehicle as in claim 8 wherein said fasteners for securing said body to said chassis unit are disposed behind the engine unit.

10. In a vehicle constructed to undergo deformation during collision in a lengthwise direction: a chassis unit extending lengthwise of the vehicle; an engine anchored to said chassis unit; a vehicle body including a compartment having a driver portion and a laterally disposed passenger portion, said body being deformable such as to allow relative lateral displacement of said portions; force transferring means operatively associated with said chassis unit and said body portions for applying outward lateral forces from said chassis unit to each of said body portions upon collision in a lengthwise direction; and yieldable fastening means between said chassis unit and said body for allowing lengthwise displacement between said chassis unit and said body portions whereby at collision said chassis unit and engine tend to split said body portions apart so that, upon relative lengthwise movement between said body and said chassis unit, said chassis unit and engine pass between said body portions.

* * * * *